REEL HUB

Filed Jan. 8, 1968 2 Sheets-Sheet 1

INVENTOR
WILLIAM G. CAMPBELL, JR.
BY Christie, Parker & Hale
ATTORNEYS

INVENTOR.
WILLIAM G. CAMPBELL, JR
BY Christie, Parker & Hale
ATTORNEYS.

3,521,828

REEL HUB

William G. Campbell, Jr., Los Angeles, Calif., assignor to Ex-Cell-O Corporation, Detroit, Mich., a corporation of Michigan Filed Jan. 8, 1968, Ser. No. 696,386
Int. Cl. B65h 17/02, 75/14
U.S. Cl. 242—68.3 6 Claims

ABSTRACT OF THE DISCLOSURE

A hub for mounting two-piece tape reels of a tape transport mechanism having a pair of spaced-apart power driven shafts. Each hub is secured to a shaft and has a configuration to positively engage one half of the reel to be mounted on it. A free end of the hub includes a pivotally mounted locking arm having a configuration to positively engage the other half of the reel. Relative rotational movements of either reel half is thereby prevented. The locking arm and the hub are constructed to bias the arm into either an open or a locking position.

BACKGROUND OF THE INVENTION

Field of the invention

This invention relates to mounting hubs and more particularly to a hub adapted to mount two-piece tape storage reels in a manner in which relative rotational movements between the hub and either portion of the reel are positively prevented.

State of the prior art

Information storing tapes, such as punched or magnetic tapes, are today widely used in conjunction with computers. Generally the tape is stored on one reel and, when information from it is to be retrieved in a computer, it is transferred past a transducing head to a second reel. Mechanically, the same process takes place when information is recorded on the tape.

After the tape has been transferred it is returned to its original reel and the reel is removed from the transport mechanism and stored. The large number of recording tapes have come to present a storage space problem. Moreover, a reel is required for each tape which is relatively expensive.

Two-piece take-down reels have therefore been devised. They have two halves which are separable by moving them axially apart. After one half has been removed the spooled tape can be lifted off the other half and stored without a reel. To use the tape on the computer the process is reversed.

In the prior art special take-down reel mounting hubs were secured to drive shafts of the transport mechanism. The hubs include a positioning flange against which the first half of the reel is placed. One or more projections in the hub engage corresponding slots in that reel half to engage the reel and drive it. The other half of the reel includes axially oriented projections which engage holes in the first half. The two halves are locked together by rotationally moving them relative to each other. The reel is locked to the hub by closing the locking arm.

The locking arm is pivotally mounted in a slot defined by two spaced-apart leaves of the hub. The leaves are flexible and arranged such that they bias the arm into either a locking or an open position.

Although this arrangement initially was satisfactory it has ceased to function properly under today's high performance requirements. The connection between the two reel halves works satisfactorily at low tape speeds of about fifteen inches per second. At such speeds the frequently occurring sudden stops and starts do not open the connection. In today's high speed tape transports, which move the tape at speeds of up to thirty inches per-second and more, the connection is often undone by the inertia of the two halves when they are suddenly stopped. Thereafter accurate spooling of the tape become difficult or impossible. The half of the reel which is free to rotate on the hub can, moreover, damage or break portions of either half. At high speeds it might even damage the locking arm or open it.

Prior art hubs and arms are preferably constructed of a plastic material. An eccentric member biases the arm into either its open or its closed position by suitably deflecting the leaves of the hub. After extended service periods one or both of the leaves have a tendency to show fatigue breaks. This requires replacement of the whole hub. If not available it may entail expensive and time-consuming down-time of the tape transport mechanism and possibly the computer.

SUMMARY OF THE INVENTION

The present invention provides a hub for use in conjunction with two-piece tape storage reels used on transport mechanism such as computer tape transports. The hub is adapted to be mounted on a rotatable drive shaft of the transport mechanism. Briefly, it includes means for positively engaging both of the halves of the tape storage reel to prevent relative rotational movements between any of the halves and the hub.

Preferably, a locking arm is pivotally mounted adjacent a free end of the hub and includes a projection adapted to engage a complementary indentation in the half of the reel adjacent the free end. The arm is pivotable from an open position which is coaxial with the hub into a locking position transverse to that axis.

Preferably, the hub includes an axial opening which mounts an axially movable member and means for biasing that member into engagement with an adjacent portion of the arm. The arm is thereby biased into either an open or a locking position.

When the arm is in a locked position its protrusion positively connects the adjacent half of the reel with the hub. Relative movements between the two reel halves are prevented since both halves are now coupled with the hub. The undesirable disconnection between the halves of prior art hubs at high speeds has thus been eliminated. The halves remain locked to each other even at highest speeds and at high deceleration rates.

Fatigue breakage of portions of the hub after extended service periods, encountered in prior art hubs, has been eliminated by providing, the axially movable member. Thus, the present invention provides a substantially more satisfactory mounting for take-down tape reels. It is especially well adapted for use under present and future high performance requirements.

DESCRIPTION OF THE PREFERRED EMBODIMENTS

Figure 1:
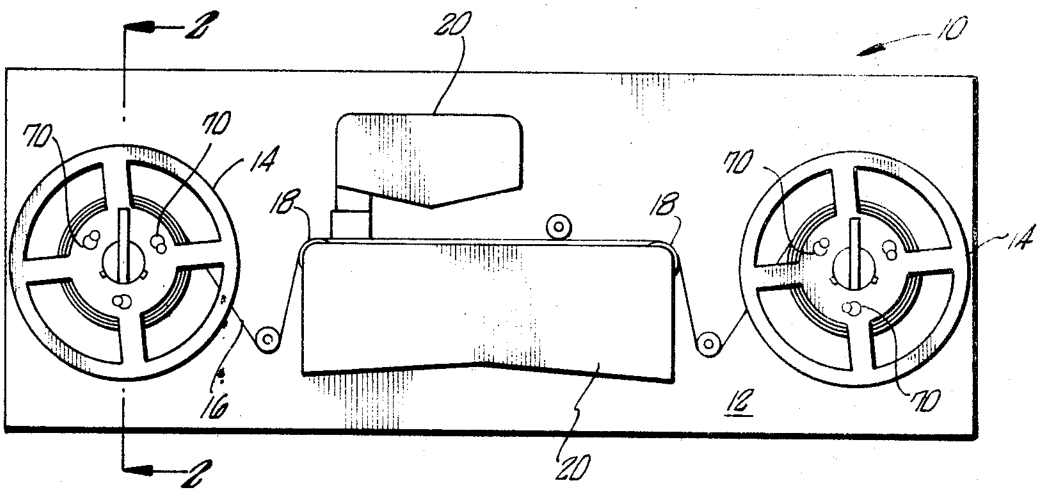
FIG. 1 is a plan view of a tape transport mechanism provided with take-down reels.

Referring first to FIG. 1, a tape transport mechanism 10 is mounted on a front panel 12 of a computer (not shown). It includes laterally spaced first and second drive shafts (not shown in FIG. 1) which project past the panel 12 and rotate tape storage reels 14 in one or the other direction. A tape 16 is guided over rollers 18 which align it with a reading and/or recording head 20. Information stored on the tape is retrieved by the head and fed to the computer or, if information is to be stored on the tape, it is recorded thereon by the head.

Although the tape transport mechanism may be anyone of a number of different types, such as magnetic tape transport or a perforated paper tape transport, the invention is described in conjunction with the latter. It is to be expressly understood, however, that this does not limit the invention for use in conjunction with transport mechanism for perforated or punched information storage tapes. Instead, this invention applies to all types of tape transports which transfer tape and spool it on a two-piece reel.

Figure 2:
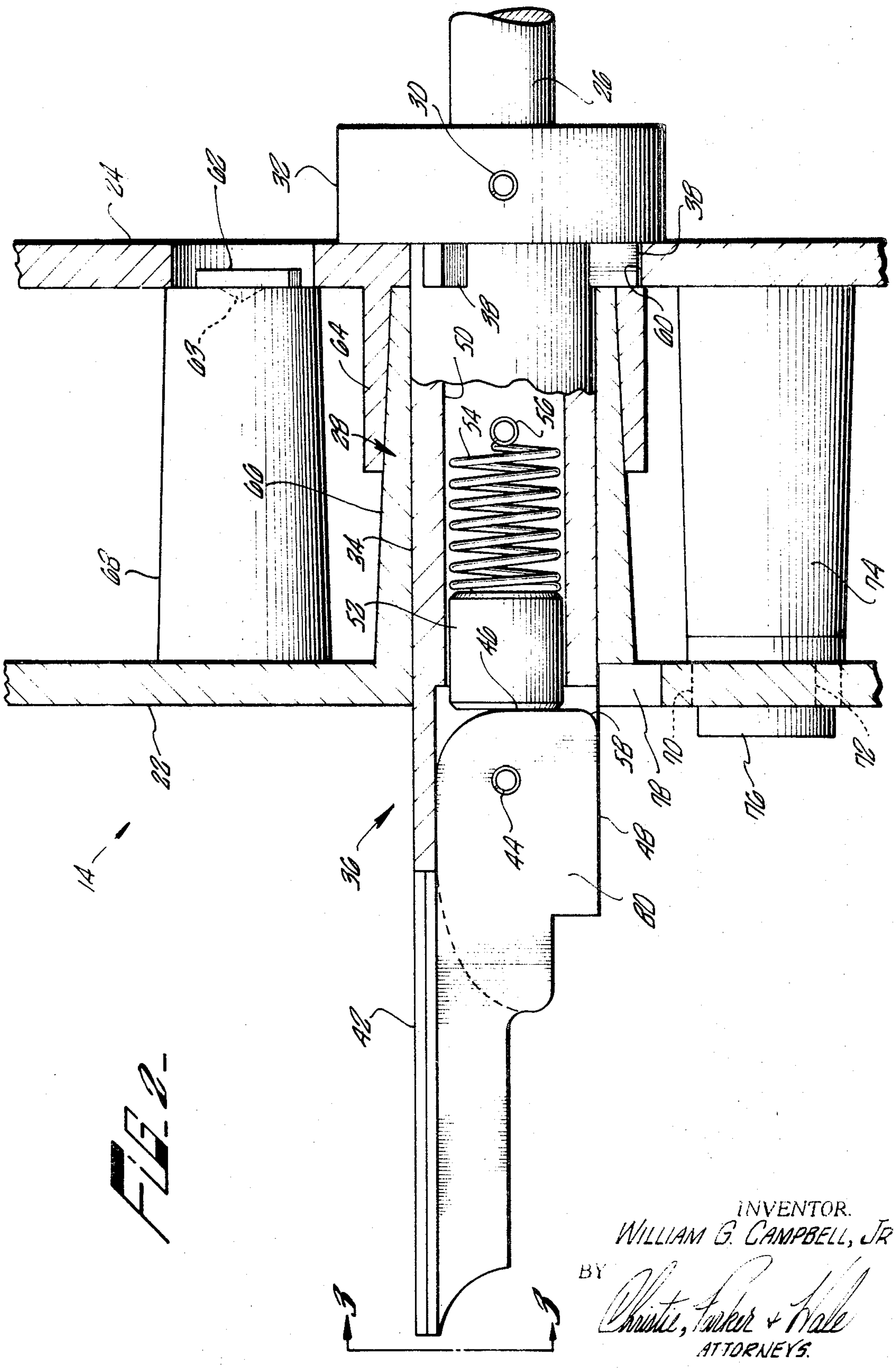
FIG. 2 is a cross-sectional view of a reel and its mounting hub taken along line 2—2 of FIG. 1.

Referring to FIG. 2, the tape reel 14 includes first and second halves 22 and 24, respectively. The halves are coupled with a drive shaft 26 of the drive mechanism by a hub 28. The hub is conventionally secured to the drive shaft such as by a locking pin 30 disposed in an end flange 32 of the hub. The hub includes a cylindrical mounting portion 34 which terminates in a free end 36 and which is dimensioned to enable the reel halves 22 and 24 to slip over it. One or more equally spaced protrusions 38 project radially outward from the mounting portion 34 adjacent the end flange 32.

Figure 3:
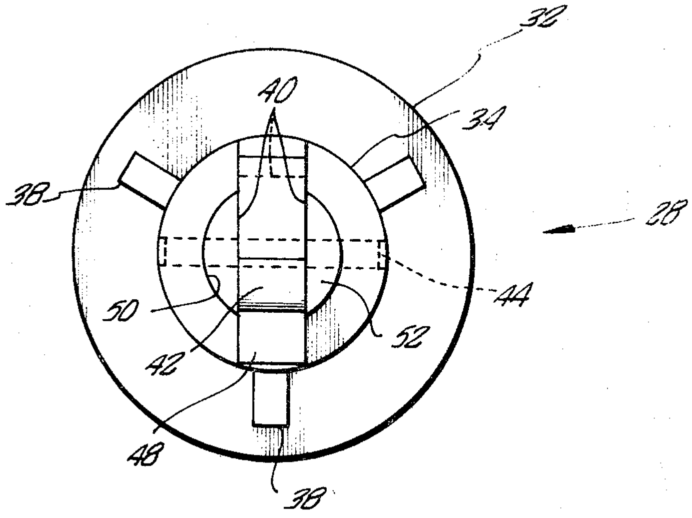
FIG. 3 is an elevational view taken along line 3—3 of FIG. 2 and shows a hub constructed in accordance with the present invention only.

Referring now to FIGS. 2 and 3, the free end 36 of the hub includes a slotted portion 40 which extends some distance towards the end flange 32, and which is sufficiently wide to receive an end of a locking arm 42. A mounting pin 44, preferably a spring pin, extends transversely through the locking arm and the hub adjacent the slotted portion 40 to pivotally mount the locking arm on the hub. When the arm is longitudinally aligned with the axis of the hub a first side 46 is transverse to the axis while a second side 48 is parallel thereto.

The hub includes an axial bore or opening 50 which opens adjacent the free end 36 and which preferably extends throughout the length of the hub. The drive shaft 26 then engages the other end of the bore. An axially slidable piston 52 is disposed in the bore and a compression spring 54 biases it toward the first side 46 when the locking arm is aligned with the axis of the hub. An end of the spring opposite from the piston is secured by a transverse pin or bolt 56 extending through the bore 50.

The piston biases the locking arm into its aligned position and prevents it from moving unless a pivotal force sufficient to overcome the spring bias is applied to the arm. If a sufficient force is applied the pivoting arm, and more particularly a corner 58 defined by the sides 46 and 48 axially moves the piston into the bore 50. After the corner 58 passed the center of the pin the spring force automatically moves the arm 42 into a locking position in which it is transverse to the axis of the hub. Thus, the piston snaps the pivotable locking arm into one or the other of the above referred to positions. While the arm is in one position it prevents unintended movements of the arm since it requires a substantial force to overcome the holding force of spring 54.

The second half 24 of the tape reel includes key slots or indentations 60 which are spaced in accordance with the spacing of the protrusions or keys 38. When the half is adjacent the end flange 32 the protrusions are engaged by the indentations and the second half is positively coupled with the hub. The second half further includes a plurality of flexible lugs 62 which are integrally constructed with the upwardly extending flanges of the reel half and which can be deflected in an axial direction. Preferably the lugs include conical protuberances 63. An annular flange 64 of the second half extends towards the first half 22 and is engaged by a mating annular flange 66 of the first half. Flange 66 mounts the first half on the mounting portion 34 of the hub 28.

The first half includes axially oriented posts 68 which are of a sufficient length to engage the protuberances 63 in indentations of the post and to slightly deflect the lugs 62 in the second flange when the two halves are operatively connected. The first flange 22 includes a plurality of slotted openings 70 (see FIG. 1) which engage recessed portions 72 of connecting posts 74 extending from the second half towards the first half. The connecting posts include a head 76 which is capable of passing through an enlarged portion of the opening 70 but which cannot pass through a narrow portion of the opening.

The halves are coupled with each other by first passing the heads 76 of the connecting posts 74 through the enlarged portions of the openings 70. The halves are then rotated relative to each other to position the recessed portions 72 of the posts 74 in the slotted and narrow part of openings 70. The halves are now secured to each other and the force from the lugs 62 prevents slight axial movements from inaccuracies in their dimensions. At the same time the forces provide a frictional engagement between the halves which must first be overcome to rotate them relative to each other and open the connection between them.

The first half 22 of the reel additionally includes one or more indentations or key slots 78 openings towards the free end 36 of the hub 28. The indentations or key slots 78 are positioned such that one of them is aligned with the plane in which the locking arm 42 pivots when the indentations or key slots 60 of the second half 24 are engaged by the protrusions or keys 38. The locking arm 42 has a configuration wherein its second side 48 defines a protrusion or keys 80 which is disposed in the identations or key slot 78 when the locking arm is positioned transversely to the hub axis. This positively secures the first half 22 of the reel 14 to the hub 28. Relative movements between the halves of the reel while they are engaged are now impossible. Unintentional opening of the coupling between the two halves, which requires a relative rotational movement between them, is thereby also made impossible.

Turning to the operation and referring to the drawings, a hub 28 including a locking arm 48 is installed on each drive shaft of the tape transport mechanism 10. The locking arm is opened and the second half 24 of the reel 14 is placed on the hub to engage the protrusions 38. A spool of recording tape (not shown) is slipped over the connecting posts 74. Thereafter the first half 22 of the reel is connected to the second half in the above described fashion. The locking arm is pivoted into its locking position and the drive shaft 26 can be rotated in either direction at any desired speed. Sudden, high speed stops do not open the connection between the two reel halves since both of them are positively locked to the hub.

I claim:

1. A hub for use with a two-piece reel comprising a hub member having a bore communicating with at least one end thereof, one end of the hub member being constructed and defined to be coupled to a drive shaft for rotatably driving a reel mounted on the hub and including means for locking only one of the of the halves of the reel adjacent the drive shaft, a reel locking arm pivotally connected to the other end of the hub, yieldable positioning means mounted in the hub bore and engageable with the adjacent end of the locking arm for normally maintaining the locking arm in alignment with the hub to allow the two halves of the reel to be mounted on the hub, the reel locking arm assuming a positive locking position with said other half of the reel upon pivoting the locking arm to a position whereby the yieldable means is overcome to thereby cause the positioning means to hold the locking arm in a driving relationship with said other half of the reel and the hub.

2. A hub as defined in claim 1 wherein said yieldable positioning means comprises a movable element mounted in said bore for slidably engaging one end of the locking arm, a compression spring having one end secured to the hub and the other end seated against the movable element whereby when the locking arm is swung against the movable element to a point whereby the compressive action of the compression spring is overcome, it allows the locking arm to be snapped into the reel locking position where it is maintained by the compression spring.

3. A hub as defined in claim 2 wherein said bore extends throughout the hub so that said one end is adapted to receive the drive shaft therein in a driving relationship.

4. A tape transport mechanism of the type employing a tape reel having a central hub receiving aperture and comprising separable, interengaging reel halves, the reel halves having a plurality of key slots spaced around the hub receiving aperture for independently locking the reel halves to a reel hub, the improvement comprising a reel hub for use with said tape reel having an axial bore and adapted for slidably mounting said tape reel, one end of the hub having a plurality of spaced-apart keys slidable into driving engagement with the key slots of a reel half for locking only one of the reel halves to the hub when mounted thereon, said one end of the hub mounting said keys being constructed and defined for receiving a drive shaft in the hub bore in driving engagement therewith, a reel locking arm pivotally secured to the other end of the hub to be pivotable between a position in alignment with the axis of the hub for allowing the reel halves to be mounted on the hub and a position transverse thereto for locking the adjacent reel half to the hub, yieldable means mounted in the hub bore and operable against the adjacent end of the locking arm for maintaining the arm in one of the aforementioned positions, said locking arm being constructed and defined with a key engageable with a key slot in the adjacent reel half when mounted on the hub for locking the adjacent reel half to the hub.

5. A tape transport as defined in claim 4 wherein said yieldable means comprises a movable element mounted in said bore for slidably engaging one end of the locking arm, a compression spring having one end secured to the hub and the other end seated against the movable element, whereby when the locking arm has been swung against the movable element to a point whereby the compressive action of the compression spring is overcome it allows the locking arm to be snapped into the reel locking position where it is maintained by the compression spring.

6. A tape transport as defined in claim 5 wherein the locking arm key is constructed and defined intermediate its ends.

References Cited

UNITED STATES PATENTS

| | | | |
|---|---|---|---|
| 2,048,382 | 7/1936 | Holden. | |
| 2,146,835 | 2/1939 | Merwin. | |
| 2,147,776 | 2/1939 | Mitchell | 242—71.9 X |
| 2,846,160 | 8/1958 | Thomason. | |
| 3,025,016 | 3/1962 | De Boo | 242—71.9 |
| 3,045,941 | 7/1962 | Keesling. | |
| 3,143,313 | 8/1964 | Purzycki. | |
| 3,288,391 | 11/1966 | Keesling. | |
| 3,409,244 | 11/1968 | Hosted | 242—68.3 |

GEORGE F. MAUTZ, Primary Examiner

U.S. Cl. X.R.

242—71.8